April 12, 1932.  C. A. DAWSON  1,853,261

AUTO RACK

Filed Dec. 19, 1928

INVENTOR.
Charles A. Dawson.
BY *Arthur C. Brown*
ATTORNEY

Patented Apr. 12, 1932

1,853,261

UNITED STATES PATENT OFFICE

CHARLES A. DAWSON, OF FARGO, NORTH DAKOTA

AUTO RACK

Application filed December 19, 1928. Serial No. 327,101.

My invention relates to racks and more particularly to devices of that character having a plurality of loops for supporting articles of various shapes and sizes, and represented by the strips mounted on toilet cases and having loops formed of flexible material by which toilet articles of various shapes and sizes may be supported. The principal objects of the invention are to adjust the sizes of the loops, and to securely latch loop forming portions of a flexible strip to a support whereby a single rack may be adapted to receive and support different articles at various times.

In a preferred form the invention comprises a relatively rigid strip to which a flexible and preferably elastic member is secured and retainers are mounted slidably on the strip for dividing the flexible member into loop-forming sections; a further particular object of the invention being to adapt the retainers to latch the loop forming portions to the support without hazard of damage to the flexible member, thereby increasing the serviceability, adjustability and wearing qualities of the device.

In accomplishing these and other objects of the invention, I have provided improved details of structure, the preferred forms of which are illustrated in the accompanying drawings, wherein.

Figure 1:
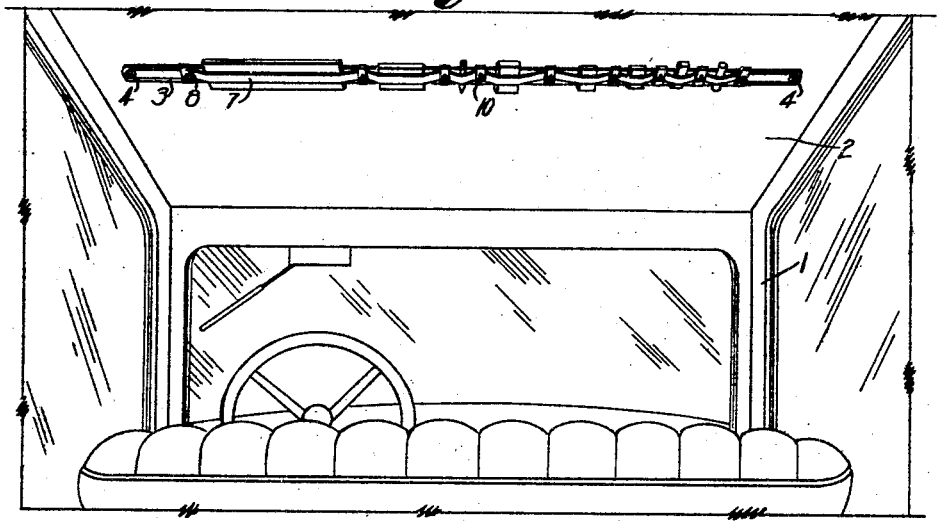
Fig. 1 is a perspective view of the front portion of an automobile and a rack embodying my invention mounted on the under surface of the roof above the driver's position.
Figure 2:
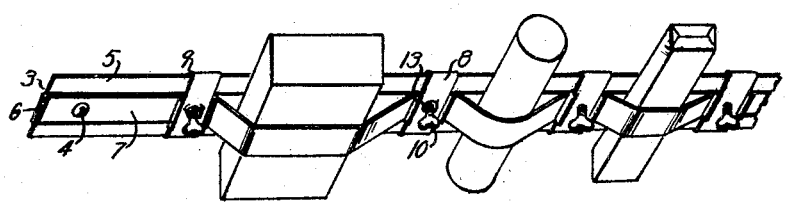
Fig. 2 is a perspective view of one end of the rack illustrating particularly the retaining members for latching loop portions of a flexible member, and articles of various types supported in the loops.
Figure 3:
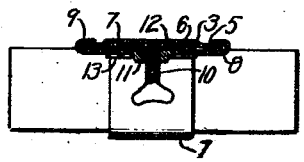
Fig. 3 is a cross-section of the rack through one of the retainers illustrating the means for latching the flexible member to the support.
Figure 4:
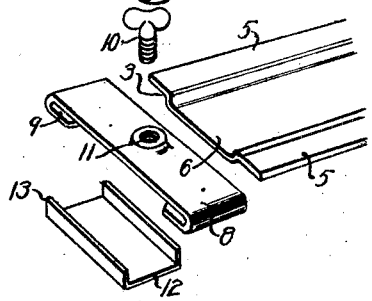
Fig. 4 is a detailed perspective view of a portion of the flanged metal strip comprising the support, a retainer, a bearing member, and a screw operable against the bearing member for latching the flexible member to the support.

Referring in detail to the drawings:

1 designates generally the front end of an automobile and 2 the roof thereof. 3 designates a relatively rigid strip formed preferably of metal and adapted to be mounted transversely of the automobile on the under surface of the roof above the driver's position, and attached securely thereto by retaining means such as screws 4 mounted in the ends of the strip.

The support is provided with longitudinal edge flanges 5 preferably formed by bending the edges of a strip having equal thickness throughout its length, whereby a channel 6 is produced.

A flexible and preferably elastic member 7 is attached to the support preferably by positioning the flexible member in the channel 6 and securing it to the support by the screws 4 which secure the support to the roof of the automobile. The screws are mounted adjacent the opposite ends of the support and the structure provides for the spacing of the flanges from the surface of the roof, the unobstructed extension of the flexible member along the support and in the channel, and for the service of the screws as stop members, as presently disclosed.

Slidable along the strip comprising the support, are retainers 8 comprising clip-like members having hooks 9 on opposite ends extending under the flanges whereby the retainers support the flexible member in loose engagement with the strip, intermediate portions of the flexible member being available between the retainers for flexing to receive articles to be supported by the rack.

I prefer to provide an elastic retainer which in normal position lies snugly in the channel and which may be stretched between adjacent retainers to form a loop to receive one of the articles; and I further provide thumb screws 10 mounted in screw-threaded openings 11 of the retainers and adapted to bear against the flexible member and to latch the flexible member to the strip. A pair of retainers may be spaced suitably for forming a loop, and adjacent thumb screws may latch the flexible member to the strip on each side of the loop to restrain the flexible member, whereby other portions may be formed as desired into other loops.

I further provide bearing plates 12 having flanges 13 engaging the sides of the retainers for mounting thereon between the bodies of the retainers and the supporting strip and slidable on the exposed surface of the flexible member, so that a screw 10 may bear against the plates and urge the same against the flexible member and the strip to latch the loop forming portions of the flexible member. The screw therefore need not bear directly against the flexible member.

The bearing plates 12 preferably have length equal to the width of the channel so that the ends of the retainers are freely slidable over the flanges of the strip and the plates are substantially free from direct contact with the supporting strip and are guided by the edges of the channel when the retainers are moved along the strip. The mounting thus facilitates the placement of the retainers while avoiding the hazard of excessive frictional engagement of the bearing plates with the strip when the retainers are adjusted, and whereby the latching of the flexible member to the strip is assured when the screws are operated.

A device of the character described is provided of shape and dimensions suitable for the particular position it is to occupy, and is particularly adapted for mounting as illustrated in an automobile for suspending various articles which a motorist may desire to have easily available. The uses include the support of small items such as a package of chewing gum, a pencil, a package of cigaretts, small boxes, and larger containers, and the retainers are moved to such positions that they will space off suitable portions of the elastic member, and support the particular articles, and the screws may fix the bearing plates against the flexible member to latch the loop portions to the support.

Other retainers may be loosely engaged with the strip and be thus available for forming other loops at any position along the strip. The fixing of the loop portions by the retainers limits the stretching of the flexible member when receiving an article, and when other portions are flexed and stretched, the stretching is not transmitted through or to the latched loop portions.

The heads of the strip-attaching screws serve as stop members to prevent the retainers from passing away from the support.

What I claim and desire to secure by Letters Patent is:

1. In a rack of the character described including a relatively rigid strip having a longitudinal channel and an elastic member mounted longitudinally of the strip and having ends fixed to the strip, a retainer slidably supported by the strip, a bearing plate slidable in said channel and engaged with the retainer, and means operating against the plate for latching the flexible member to the strip.

2. A rack comprising a relatively rigid strip having a longitudinal channel, an elastic member having ends secured to the strip, and normally extending in the channel, retainers slidable on the strip, bearing members engaged with the retainers and guided in said channel, and means supported by the retainers for urging said bearing members against the elastic member to latch the same to the strip.

3. In a rack of the character described including a strip having a longitudinal channeled portion and offset edge flanges, an elastic member normally lying in said channel, retainers slidable on the strip having hooks engaging said flanges, bearing plates guided in said channel adjacent said elastic member and having side flanges engaging the retainers, and means on the retainers for urging said bearing plates against the elastic member.

In testimony whereof I affix my signature.

CHARLES A. DAWSON.